(12) United States Patent
Mujtaba et al.

(10) Patent No.: US 8,619,907 B2
(45) Date of Patent: *Dec. 31, 2013

(54) METHOD AND APPARATUS FOR PREAMBLE TRAINING IN A MULTIPLE ANTENNA COMMUNICATION SYSTEM

(75) Inventors: Syed Aon Mujtaba, Berkeley Heights, NJ (US); Xiaowen Wang, Bridgewater, NJ (US)

(73) Assignee: Agere Systems, LLC, Allentown, PA (US)

( * ) Notice: Subject to any disclaimer, the term of this patent is extended or adjusted under 35 U.S.C. 154(b) by 1990 days.

This patent is subject to a terminal disclaimer.

(21) Appl. No.: 11/043,025

(22) Filed: Jan. 24, 2005

(65) Prior Publication Data
US 2005/0276347 A1 Dec. 15, 2005

Related U.S. Application Data

(60) Provisional application No. 60/578,776, filed on Jun. 10, 2004.

(51) Int. Cl.
*H04L 27/00* (2006.01)
(52) U.S. Cl.
USPC ........... 375/299; 375/260; 375/267; 375/340; 375/347; 375/349; 370/334; 455/101; 455/103
(58) Field of Classification Search
CPC .. H04L 5/0048; H04B 7/0413; H04B 7/0684; H04B 7/0613; H04B 7/0817
USPC ......... 375/260, 267, 299, 316, 340, 346, 347, 375/349; 455/101, 132, 296, 103; 370/334, 370/310, 505, 338, 203–208
See application file for complete search history.

(56) References Cited

U.S. PATENT DOCUMENTS

| | | | | |
|---|---|---|---|---|
| 7,233,625 B2 * | 6/2007 | Ma et al. | ........................ | 375/260 |
| 7,269,430 B2 * | 9/2007 | Moorti et al. | ................. | 455/458 |
| 7,310,304 B2 * | 12/2007 | Mody et al. | ................... | 370/208 |
| 7,324,605 B2 * | 1/2008 | Maltsev et al. | ............... | 375/299 |
| 7,352,688 B1 * | 4/2008 | Perahia et al. | ................. | 370/206 |
| 7,408,976 B1 * | 8/2008 | Narasimhan et al. | ......... | 375/148 |

(Continued)

FOREIGN PATENT DOCUMENTS

WO WO 2005/006699 A1 1/2005

OTHER PUBLICATIONS

Liu et. al., "A Mimo system with backward compatibility for ofdm based WLANS", IEEE 2003.*

(Continued)

*Primary Examiner* — Sophia Vlahos
(74) *Attorney, Agent, or Firm* — Ryan, Mason & Lewis, LLP

(57) ABSTRACT

Methods and apparatus are provided for communicating data in a multiple antenna communication system having N transmit antennas. According to one aspect of the invention, a header format includes a legacy preamble having at least one legacy long training field and an extended portion having at least N additional long training fields on each of the N transmit antennas. The N additional long training fields may be tone interleaved across the N transmit antennas and are used for MIMO channel estimation. The extended portion may include a short training field for power estimation. The short training field may be tone interleaved across the N transmit antennas and have an extended duration to support beam steering.

24 Claims, 17 Drawing Sheets

(56) References Cited

U.S. PATENT DOCUMENTS

| | | | |
|---|---|---|---|
| 2003/0072452 A1 | 4/2003 | Mody et al. | |
| 2004/0004934 A1* | 1/2004 | Zhu et al. | 370/208 |
| 2005/0013238 A1* | 1/2005 | Hansen | 370/203 |
| 2005/0152314 A1* | 7/2005 | Sun et al. | 370/334 |
| 2005/0180361 A1* | 8/2005 | Hansen et al. | 370/334 |
| 2005/0233709 A1* | 10/2005 | Gardner et al. | 455/101 |
| 2005/0286474 A1* | 12/2005 | van Zelst et al. | 370/334 |
| 2007/0230403 A1* | 10/2007 | Douglas et al. | 370/334 |

OTHER PUBLICATIONS

Sun et. al., "Training Sequence Assisted Channel Estimation for MIMO OFDM" IEEE 2003.*

Liu et al., "A MIMO System with Backward Compatibility for OFDM Based WLANS," $4^{th}$ IEEE Workshop on Signal Processing Advances in Wireless Communications, pp. 130-134 (2003).

Liu et al., "A MIMO System with Backward Compatibility for OFDM Based WLANS," 4th IEEE Workshop on Signal Processing Advances in Wireless Communications, pp. 130-134 (2003).

* cited by examiner

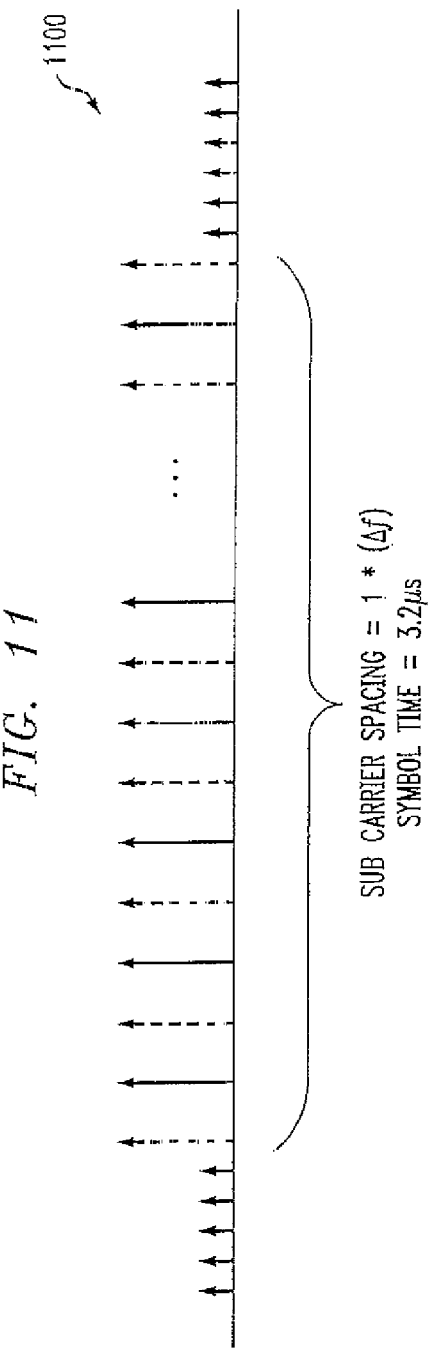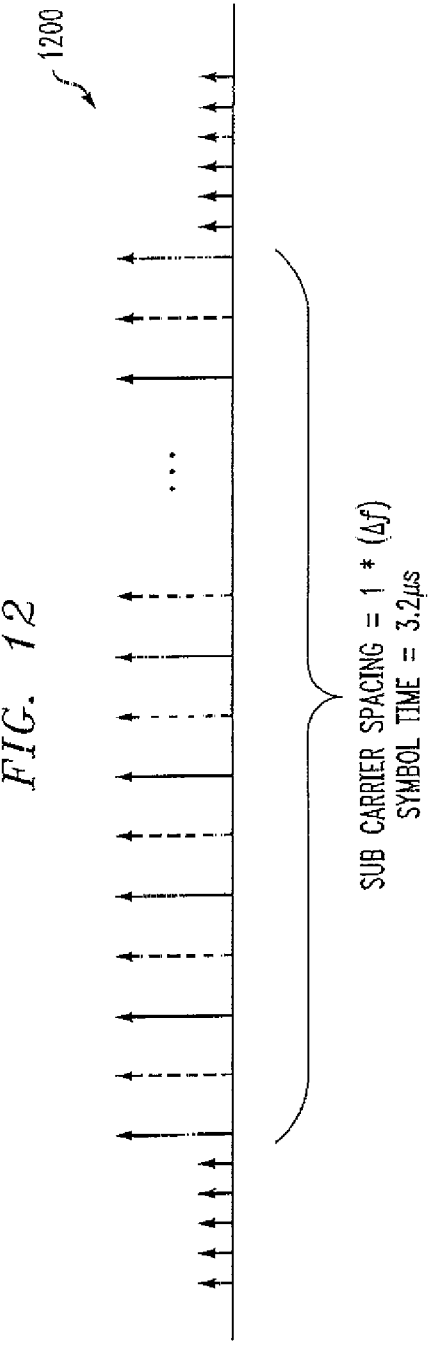

METHOD AND APPARATUS FOR PREAMBLE TRAINING IN A MULTIPLE ANTENNA COMMUNICATION SYSTEM

CROSS-REFERENCE TO RELATED APPLICATIONS

The present application claims priority to U.S. Provisional Patent Application Ser. No. 60/578,776, filed Jun. 10, 2004, incorporated by reference herein.

FIELD OF THE INVENTION

The present invention relates generally to multiple antenna wireless communication systems, and more particularly, to preamble training techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receiver receives a combination of these data streams on multiple receive antennas.

In order to properly receive the different data streams, receivers in a multiple antenna communication system must acquire the channel matrix through training. This is generally achieved by using a specific training symbol, or preamble, to perform synchronization and channel estimation. It is desirable for multiple antenna communication system to co-exist with legacy single antenna communications systems (typically referred to as Single Input Single Output (SISO) systems). Thus, a legacy (single antenna) communications system must be able to interpret the preambles that are transmitted by multiple antenna communication systems. Most legacy Wireless Local Area Network (WLAN) systems based upon OFDM modulation comply with either the IEEE 802.11a or IEEE 802.11g standards (hereinafter "IEEE 802.11a/g"). Generally, the preamble signal seen by the legacy device should allow for accurate synchronization and channel estimation for the part of the packet that the legacy device needs to understand. Previous MIMO preamble formats have reused the legacy training preamble to reduce the overhead and improve efficiency. Generally, the proposed MIMO preamble formats include the legacy legacy training preamble and additional long training symbols, such that the extended MIMO preamble format includes at least one long training symbol for each transmit antenna or spatial stream.

A number of frame formats have been proposed for evolving multiple antenna communication systems, such as MIMO-OFDM systems. Existing frame formats provide inaccurate estimations for the MIMO systems, such as inaccurate power measurement or outdated frequency offset and timing offset information, or fail to provide full backwards compatibility to the legacy devices of some vendors. In one proposed MIMO frame format, each transmit antenna sequentially transmits one or more long training symbols, such that only one transmit antenna is active at a time. As the transmit antennas are switched on and off, however, the temperature of the corresponding power amplifier will increase and decrease, respectively. Generally, such heating and cooling of the power amplifier will lead to "breathing" effects that cause the transmitted signal to have a phase or magnitude offset, relative to the desired signal.

It is therefore desirable to have a continuous transmission from all transmit antennas to avoid temperature related signal "breathing." Thus, in further proposed MIMO frame formats, orthogonality is maintained using cyclic delay diversity (CDD) or tone-interleaving across different transmit antennas. The CDD short training symbol, however, cannot measure the received signal power with sufficient accuracy. Thus, additional backoff is required in the RF chain and additional dynamic range is required in the digitization process. Likewise, the tone interleaved design is not fully backwards compatible with a number of existing 802.11a/g devices that use short training for timing synchronization or use time domain channel estimation.

A need therefore exists for a method and system for performing channel estimation and training in a MIMO-OFDM system that is compatible with current IEEE 802.11a/g standard (SISO) systems, allowing MIMO-OFDM based WLAN systems to efficiently co-exist with SISO systems. A further need exists for MIMO preamble formats and training techniques that provide improved automatic gain control.

SUMMARY OF THE INVENTION

Generally, methods and apparatus are provided for communicating data in a multiple antenna communication system having N transmit antennas. According to one aspect of the invention, a disclosed header format includes a legacy preamble having at least one legacy long training field and an extended portion having at least N additional long training fields on each of the N transmit antennas. The N additional long training fields may be tone interleaved across the N transmit antennas and are used for MIMO channel estimation. The extended portion may include a short training field for power estimation. The short training field may be tone interleaved across the N transmit antennas and have an extended duration to support beam steering.

A more complete understanding of the present invention, as well as further features and advantages of the present invention, will be obtained by reference to the following detailed description and drawings.

BRIEF DESCRIPTION OF THE DRAWINGS

FIG. 11 illustrates an exemplary design for the first long training symbol of FIG. 8 in the exemplary two transmit branch implementation (or two spatial streams case);

FIG. 12 illustrates an exemplary design for the second long training symbol of FIG. 8 in the exemplary two transmit branch implementation (or two spatial streams case);

DETAILED DESCRIPTION

The present invention provides preamble formats and techniques for preamble training for MIMO system. The training phase of a MIMO transmission will contain two phases. The first training phase is a legacy training phase particularly suited, for example, to WLAN OFDM legacy systems and the second phase is particularly suited to a multiple antenna system, such as a MIMO system. To overcome the problems in the prior systems, the Automatic Gain Control (AGC) of a receiver will perform one training during the first training phase and the AGC of the receiver will retrain during the second training phase. This will allow the receiver to retrain its power measurements during the MIMO phase in order to ensure accuracy, while also allowing the receiver to be backwards compatible to WLAN systems that are not MIMO based.

Figure 1:
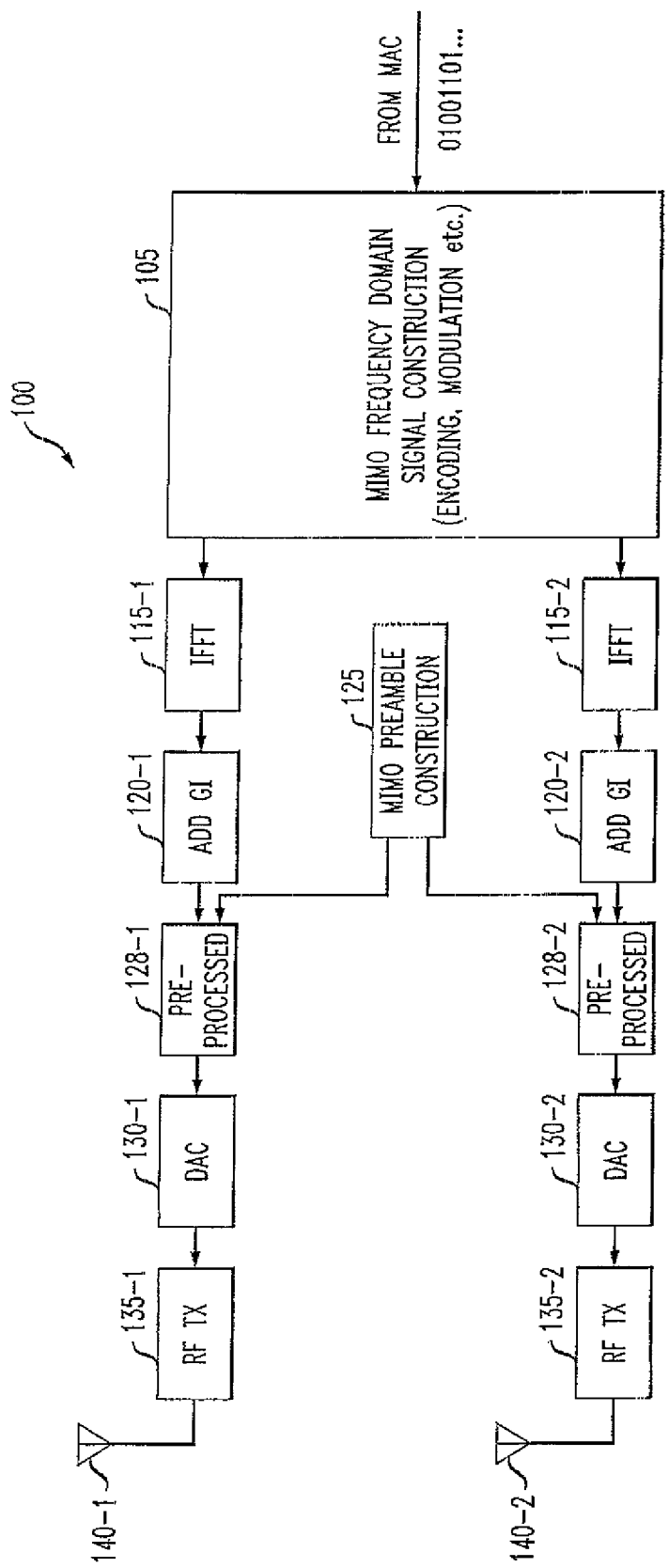
FIG. 1 is a schematic block diagram of an exemplary MIMO transmitter.

FIG. 1 is a schematic block diagram of a MIMO transmitter 100. As shown in FIG. 1, the exemplary two antenna transmitter 100 encodes the information bits received from the medium access control (MAC) layer and maps the encoded bits to different frequency tones (subcarriers) at stage 105. For each transmit branch, the signal is then transformed to a time domain wave form by an IFFT (inverse fast Fourier transform) 115. A guard interval (GI) of 800 nanoseconds (ns) is added in the exemplary implementation before every OFDM symbol by stage 120 and a preamble of 32 μs is added by stage 125 to complete the packet. The digital signal is then pre-processed at stage 128 and converted to an analog signal by converter 130 before the RF stage 135 transmits the signal on a corresponding antenna 140.

Figure 2:
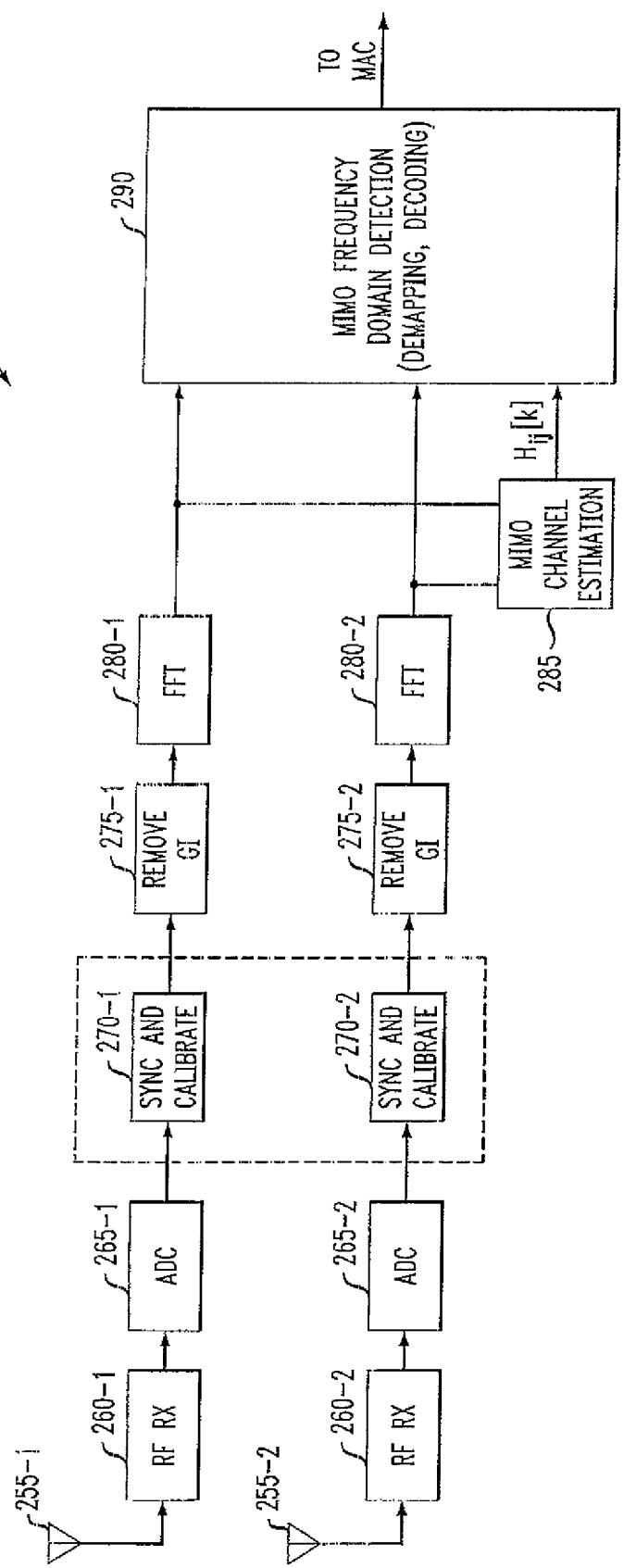
FIG. 2 is a schematic block diagram of an exemplary MIMO receiver.

FIG. 2 is a schematic block diagram of a MIMO receiver 200. As shown in FIG. 2, the exemplary two antenna receiver 200 processes the signal received on two receive antennas 255-1 and 255-2 at corresponding RF stages 260-1, 260-2. The analog signals are then converted to digital signals by corresponding converters 265. The receiver 200 processes the preamble to detect the packet, and then extracts the frequency and timing synchronization information at synchronization stage 270 for both branches. The guard interval is removed at stage 275. The signal is then transformed back to the frequency domain by an FFT at stage 280. The channel estimates are obtained at stage 285 using the long training symbol. The channel estimates are applied to the demapper/decoder 290, and the information bits are recovered.

Figure 3:
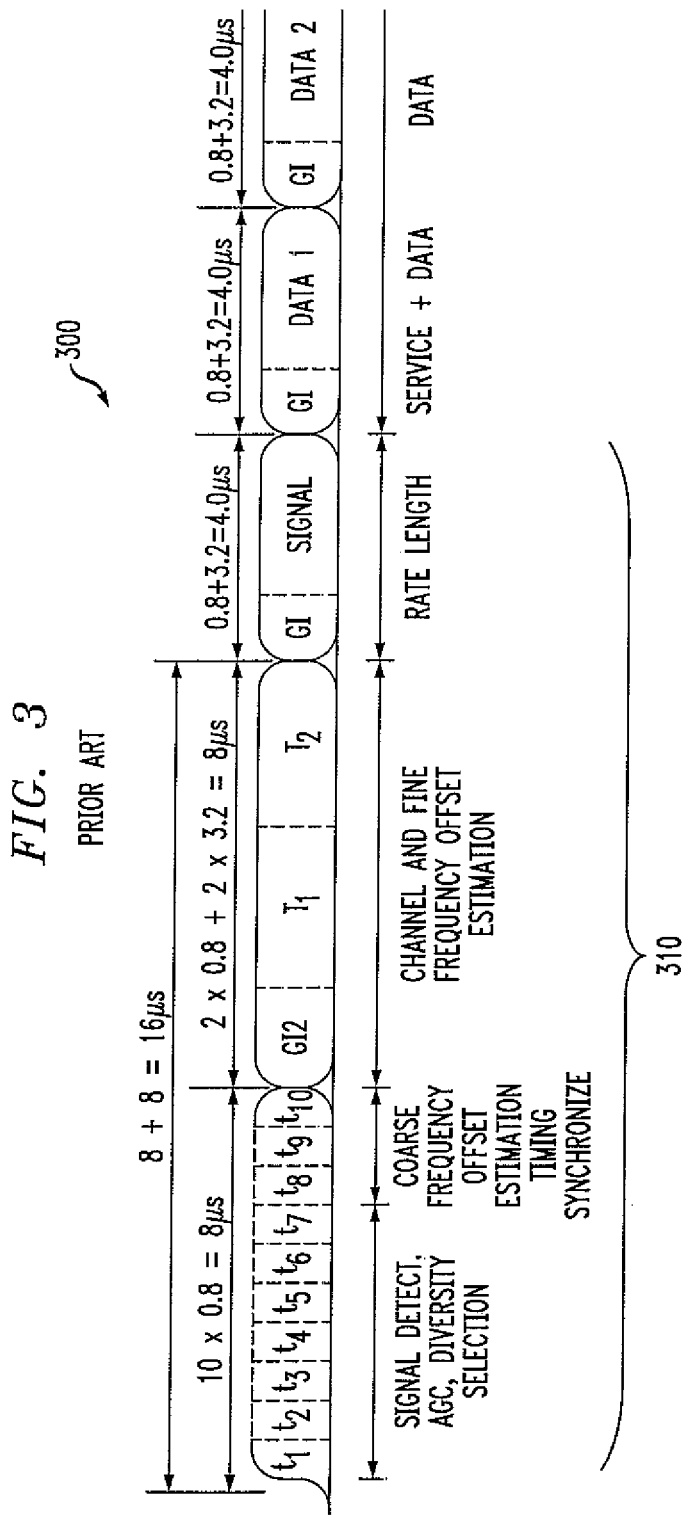
FIG. 3 illustrates a conventional frame format in accordance with the IEEE 802.11a/g standards.

FIG. 3 illustrates a conventional frame format 300 in accordance with the IEEE 802.11a/g standards. As shown in FIG. 3, the frame format 300 comprises ten short training symbols, t1 to t10, collectively referred to as the Short Preamble. Thereafter, there is a Long Preamble, consisting of a protective Guard Interval (GI2) and two Long Training Symbols, T1 and T2. A SIGNAL field is contained in the first real OFDM symbol, and the information in the SIGNAL field is needed to transmit general parameters, such as packet length and data rate. The Short Preamble, Long Preamble and Signal field comprise a legacy header 310. The OFDM symbols carrying the DATA follows the SIGNAL field.

The preamble includes two parts, the training part and the signal field. The training part allows the receiver 200 to perform packet detection, power measurements for automatic gain control (AGC), frequency synchronization, timing synchronization and channel estimation. The signal field is going to be transmitted in the lowest rate and gives information, for example, on data rate and packet length. In the MIMO system, the signal field should also indicate the number of spatial streams and the number of transmit antennas 140.

The receiver 200 uses the preamble to get all the above information in the preamble. Based on this information, when the data arrives, the receiver 200 removes the GI and transforms the data into the frequency domain using FFT, de-interleaves and decodes the data.

As previously indicated, in a MIMO system, besides these functions, it is also preferred that the preamble be backwards compatible with the legacy 802.11a/g devices, i.e., the legacy device should be able to get correct information about the duration of the packet so that it can backoff correctly and does not interrupt the MIMO HT transmission.

Figure 4:
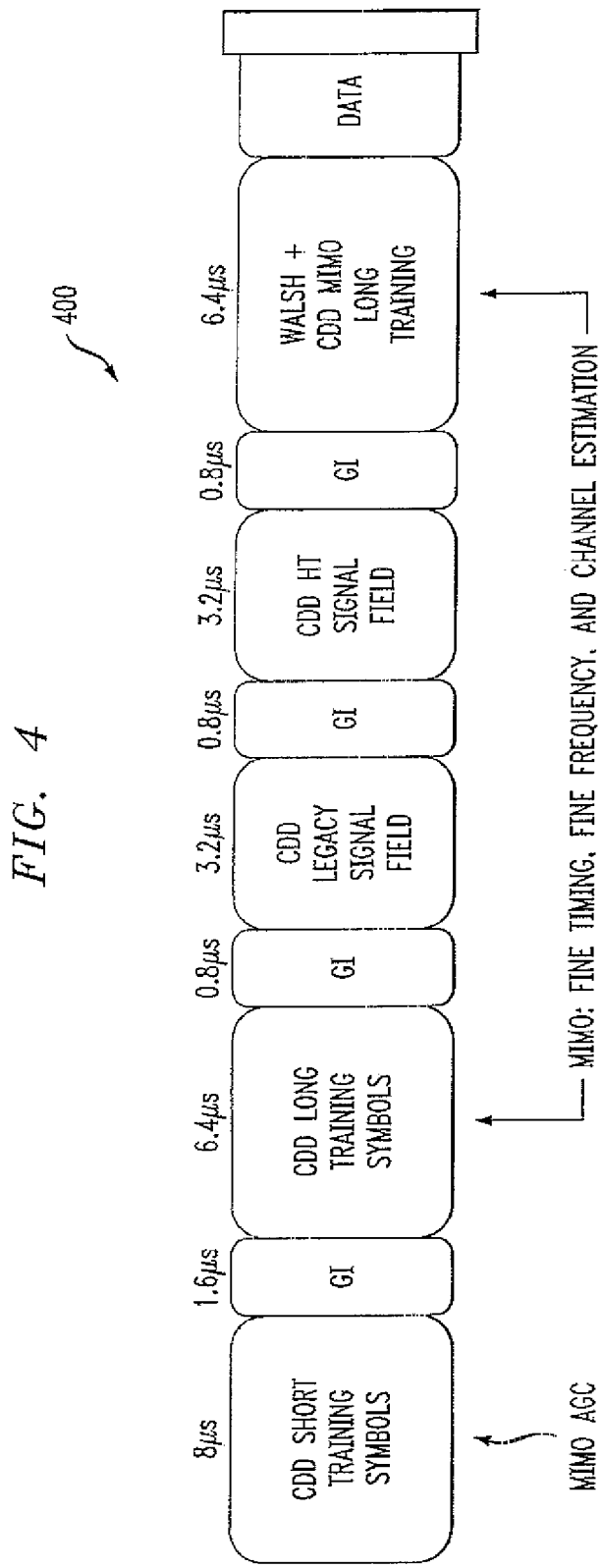
FIG. 4 illustrates an exemplary backward compatible preamble design using CDD.

It is noted that there are three techniques for achieving orthogonality in a multiple antenna system. In particular, orthogonality may be achieved using (i) time diversity, (ii) cyclic delay diversity (CDD), or (iii) tone interleaving (across frequency). FIG. 4 illustrates an exemplary backward compatible preamble design 400 based on CDD. As shown in FIG. 4, the legacy short training, long training, legacy signal field and high throughput (HT) signal field are all transmitted in a CDD fashion, as discussed below in conjunction with FIG. 5.

Figure 5:
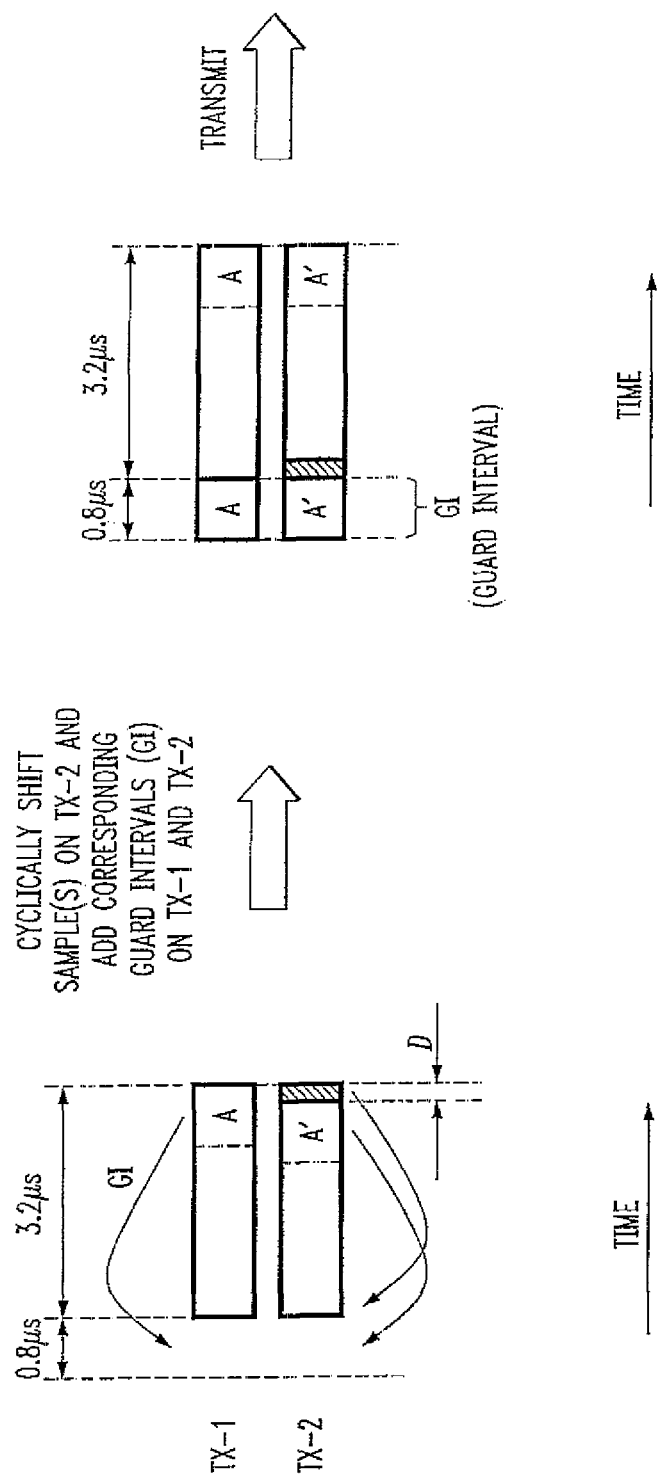
FIG. 5 illustrates the generation of a CDD signal.

FIG. 5 illustrates the generation of a CDD signal by putting the last A samples of the OFDM symbol to the beginning. Different antennas have different cyclic delays. Then following the signal fields are the MIMO training fields. In this design, the legacy training fields are reused for MIMO purpose, then, only MIMO long training is needed. The MIMO long training fields are also CDD constructed such that different transmit antennas add different phase shifts to the signal.

In the embodiment of FIG. 5, the samples on the second transmit branch are cyclically shifted and corresponding Guard Intervals (GI) are added on transmit branches Tx-1 and Tx-2. As shown in FIG. 5, such a cyclic rotation can be achieved, for example, by putting the last samples of duration D of one OFDM symbol (still without guard interval, GI) before the rest of the symbol. Then, the guard interval, reusing the last G samples (0.8 microseconds in 802.11a OFDM) from the newly created symbol (shown as A' in FIG. 5), is added. This cyclic rotation is done for all OFDM symbols across the whole packet per OFDM symbol including the preambles.

It is noted that the Short Preamble in IEEE 802.11a OFDM doesn't have an explicit Guard interval, so there, the cyclic rotation should be taken across all ten Short Preamble symbols that form the Short Preamble, and no GI subsequent addition step is required. Alternatively, it can be carried out individually per each one of the ten Short Training segments (due to periodicity, there is no difference). For the Long Preamble, the rotation should take place per each one of the two Long Training Sequences or across both at the same time, again there is no difference. Then, the (long) GI should be based on the newly constructed Long Training Sequence.

The problem with the design 400 of FIG. 4 is that the AGC power measurement of the legacy short training is not accurate compared to the MIMO training and data received power. There is typically 6 dB measurement error that needs to increase the dynamic range of the A/D 265 by one bit. This not only increases the A/D cost but also increases the dynamic range of all the analog and digital circuits. It is noted that the preamble format 400 of FIG. 4 uses the first Long Preamble in the legacy header for MIMO channel estimation.

Figure 6:
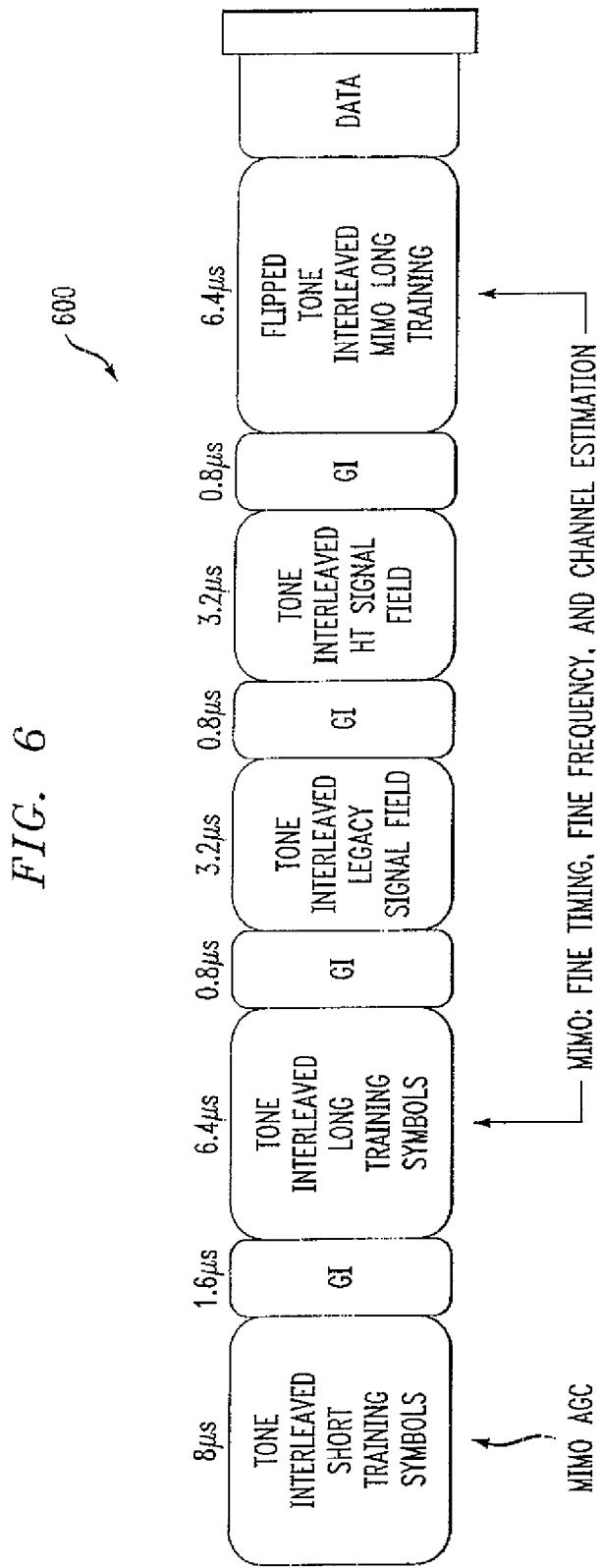
FIG. 6 illustrates an alternate preamble design based on tone interleaving.

FIG. 6 illustrates an alternate preamble design 600 that reuses the legacy preamble based on tone interleaving. In this design, the preamble is not transmitted in a CDD fashion across antennas (as in FIG. 4) but rather, is transmitted using tone interleaving. Different tones of the legacy preamble and legacy and HT signal fields are transmitted on different transmit antennas, such that a subcarrier (tone) is active on only one transmit branch at a time. In the MIMO long training part, the tones are alternated across the antennas so that all the tones are trained with the MIMO long training and legacy long training. This design 600 solves the problem of the accuracy of power measurement. However, it is not fully backward compatible with some existing vendors using certain receiver algorithms. It is noted that the preamble format 600 of FIG. 6 uses the first Long Preamble in the legacy header for MIMO channel estimation.

If the MIMO preamble is not backward compatible, however, then MAC layer protection mechanism, such as Request-to-Send/Clear-to-Send (RTS/CTS) has to be used. If this is the case, then a dedicated MIMO preamble can be designed just to optimize the MIMO system performance. The present invention provides both backwards compatible preamble design and a preamble design with RTS/CTS.

MIMO Preamble with RTS/CTS Protection

Figure 7:
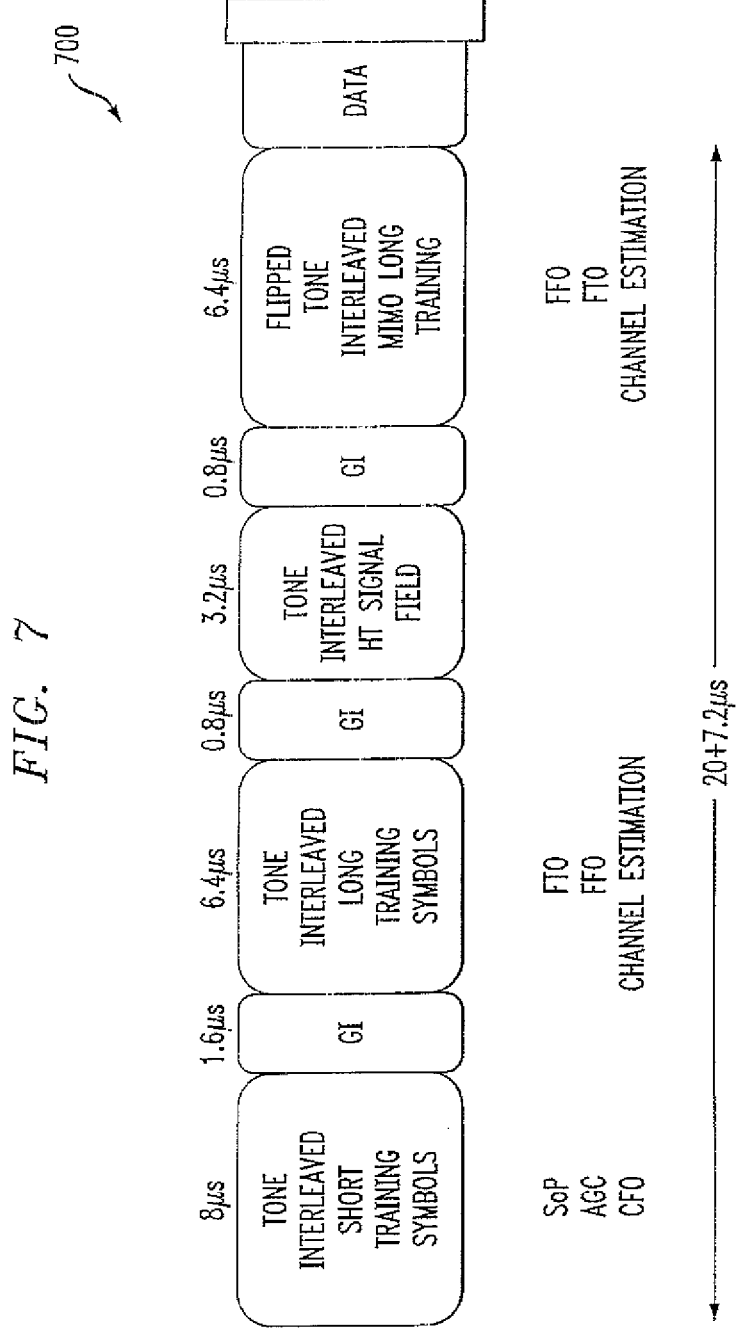
FIG. 7 illustrates a MIMO preamble design with RTS/CTS protection.

FIG. 7 illustrates a MIMO preamble design 700 with RTS/CTS protection. As shown in FIG. 7, the preamble format 700 includes 10 tone-interleaved short training symbols, each 0.8 μs in the exemplary embodiment, for packet detection, AGC and coarse frequency offset estimation. Then, tone-interleaved long training symbols are used for fine timing synchronization, fine frequency synchronization and channel estimation. Following the first long training symbols is the high throughput signal field. The signal field signals, for example, the number of special streams and number of antennas. Additional long training fields are then sent, if necessary. The number of long training fields equals the number of spatial streams or the number of the transmit antennas. The data is then sent after all the long training fields. The preamble format 700 of FIG. 7 is not backwards compatible (since it does not contain a legacy signal field).

Backwards Compatible Preamble Format

Figure 8:
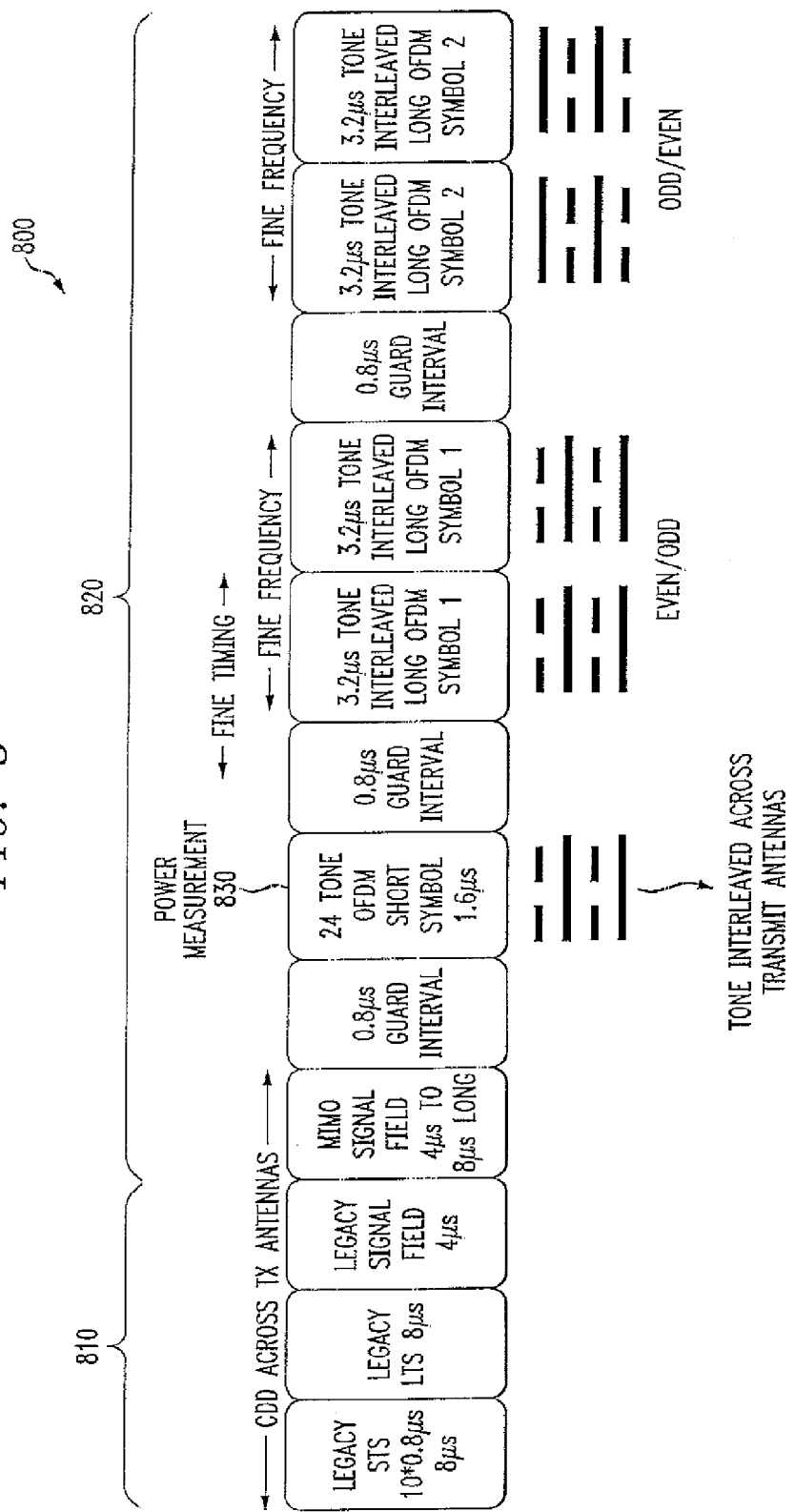
FIG. 8 illustrates a preamble design incorporating features of the present invention that is backwards compatible with 802.11a/g legacy devices.

FIG. 8 illustrates a preamble design 800 incorporating features of the present invention that is backwards compatible with 802.11a/g legacy devices. The preamble design 800 provides a dedicated legacy portion 810 with a signal field for backward compatibility and a dedicated MIMO training portion 820 for performance of the MIMO system.

In the preamble design 800, the transmitter 100 first transmits the legacy 802.11a/g preamble 810 using CDD. The legacy preamble 810 performs the packet detection and coarse frequency offset estimation. The results of these two functions are also going to be used in the MIMO transmission. Besides these two functions, the legacy preamble 810 is also used to perform legacy AGC, timing and frequency synchronization and channel estimation. The receiver 200 then decodes the following legacy and HT signal fields. The HT signal field is also transmitted using CDD. As shown in FIG. 8, following the legacy and HT signal fields is a MIMO short training field 830 and then the MIMO long training fields. The MIMO short training field 830 is used only to adjust the AGC setting, and the length can be much shorter than the legacy short training field. As illustrated here, the MIMO short training field includes a 0.8 μs guard interval and a 1.6 μs training symbol for the accurate power measurement.

It is noted that the preamble format 800 of FIG. 8 does not use the first Long Preamble in the legacy header for MIMO channel estimation. The dedicated short training symbol 830 allows precise power measurement for MIMO, at the expense of higher preamble overhead (9.6 us extra). Hence, the preamble format 800 provides low dynamic range requirements (ten bit ADC).

The MIMO long training fields of FIG. 8 are transmitted on the same frequency grid as the data, as discussed below in conjunction with FIG. 11. Thus, Frequency Domain Channel Estimation (FDE) may be performed.

Figure 9:
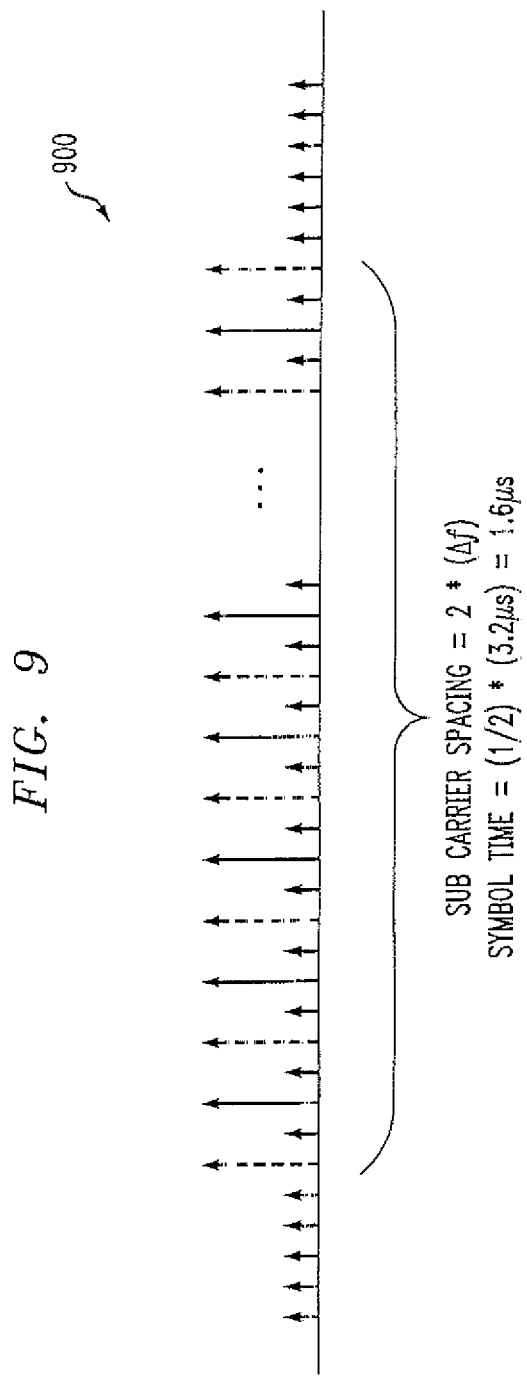
FIG. 9 illustrates an exemplary design for the short training symbol of FIG. 8 to measure MIMO power (AGC)

The short training field 830 of FIG. 8 is constructed in a tone-interleaved fashion, as shown in FIG. 9. FIG. 9 illustrates an exemplary design 900 for the short training symbol 830 to measure MIMO power (AGC). While an OFDM symbol with 12 tones (i.e., 0.8 us long) would be sufficient to provide accurate power across four antennas, a 24-tone OFDM symbol (i.e. 1.6 us long) provides even more accuracy, at the expense of slightly larger overhead. The populated tones are interleaved across the transmit antennas, as shown in FIG. 9 for the case of two antennas. Dashed tones are transmitted from antenna # 1, and solid tones are transmitted from antenna # 2.

Since the short training symbol 830 is only 1.6 μs long, only 24 tones are used (of 64 total available tones). The indices of those tones are all multiples of four, so that the resulting time domain signal has a period of 1.6 μs. In the exemplary two antenna case, only half of the tones are transmitted on each transmitter antenna, i.e., every other used tone is transmitted on the first antenna and the rest of tones are transmitted on the second antenna. Moreover, this short training symbol 830 can be further shortened to 0.8 μs, which only uses 12 tones, to reduce the overhead.

Figure 10:
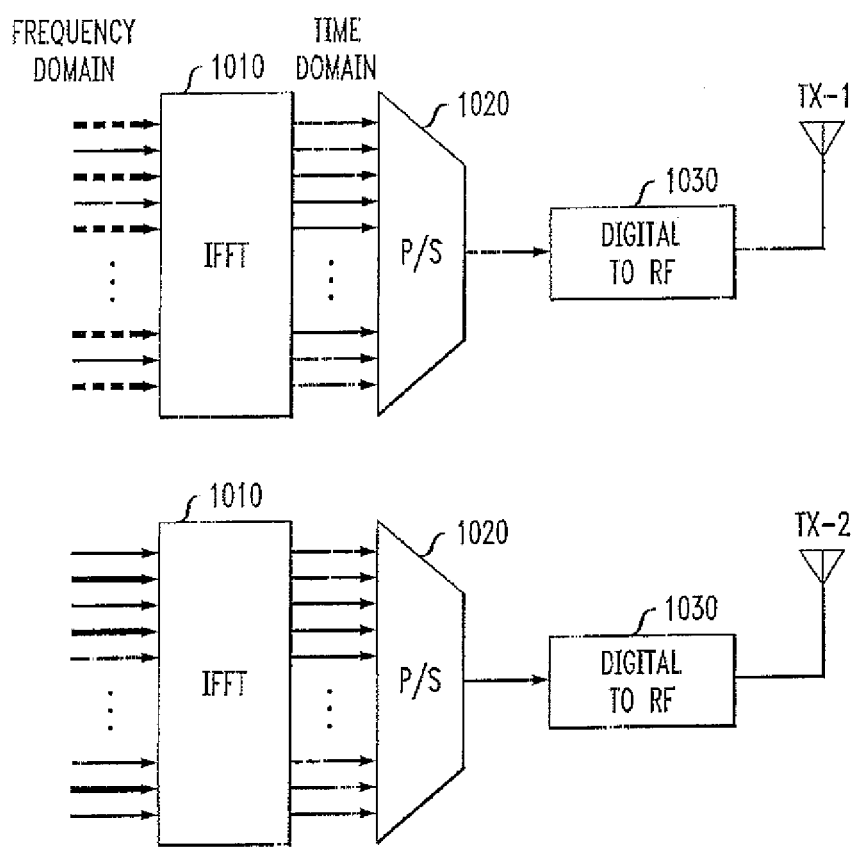
FIG. 10 illustrates an exemplary architecture for generating the short training symbol of FIG. 8 at the transmitter of FIG. 1.

FIG. 10 shows the architecture for generating the short training symbol 830 of FIG. 8 at the transmitter 100. As shown in FIG. 10, the active dashed tones are transmitted from antenna 1 (TX-1), and solid tones are transmitted from antenna 2 (TX-2). For each transmit branch, the active tones are transformed to a time domain wave form by an IFFT (inverse fast Fourier transform) 1010, the time domain signals are then converted to a serial stream at stage 1020, and the digital signal is upconverted to an RF signal at stage 1030 prior to transmission from each antenna (TX).

The MIMO long training fields of FIG. 8 are transmitted after the short training symbol 830. In the preamble format 800, since the AGC is readjusted, the legacy long training field cannot be reused for the MIMO purpose. The number of long training fields is equal to the number of spatial streams or number of the transmit antennas. Each long training filed is constructed in a tone interleaved way, with the first long training symbol using even/odd tones and the second long training symbol using odd/even tones in the exemplary embodiment.

FIG. 11 illustrates an exemplary design 1100 for the first long training symbol of FIG. 8 in the exemplary two transmit branch implementation (or two spatial streams case). The exemplary design 1100 employs 48 tones. The even tones are transmitted on the first transmit antenna and the odd tones are transmitted on the second transmit antenna in the first long training field.

FIG. 12 illustrates an exemplary design 1200 for the second long training symbol of FIG. 8 in the exemplary two transmit branch implementation (or two spatial streams case). The exemplary design 1200 employs 48 tones. The odd tones are transmitted on the first transmit antenna and the even tones are transmitted on the second transmit antenna in the second long training field.

In this way, all the tones on all the transmit antennas or spatial streams are covered after all the long training fields. In the case of more transmit antennas or spatial streams, in the same long training field, different antennas transmit different tones. The tones are alternated among antennas in different training fields to ensure that all the tones are covered by the training. The MIMO long training fields are used for the fine timing synchronization, fine frequency synchronization and channel estimation.

Figure 13:
FIGS. 13 and 14 illustrate preamble designs incorporating features of the present invention that for exemplary three and four transmit antenna implementations, respectively.
Figure 14:
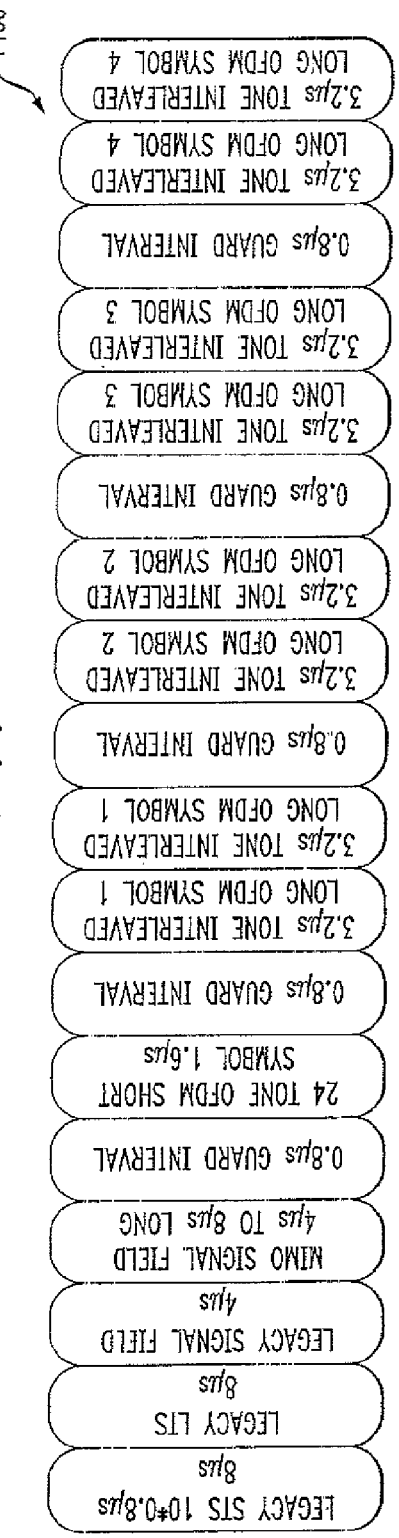

FIGS. 13 and 14 illustrate preamble designs 1300, 1400, incorporating features of the present invention that for exemplary three and four transmit antenna implementations, respectively. Generally, for each additional transmit antenna (or spatial stream), the preamble format is extended to include an additional guard interval and long training symbol (comprised of two 3.2 µs long OFDM symbols).

Further Backward Compatible Designs

Figure 15:
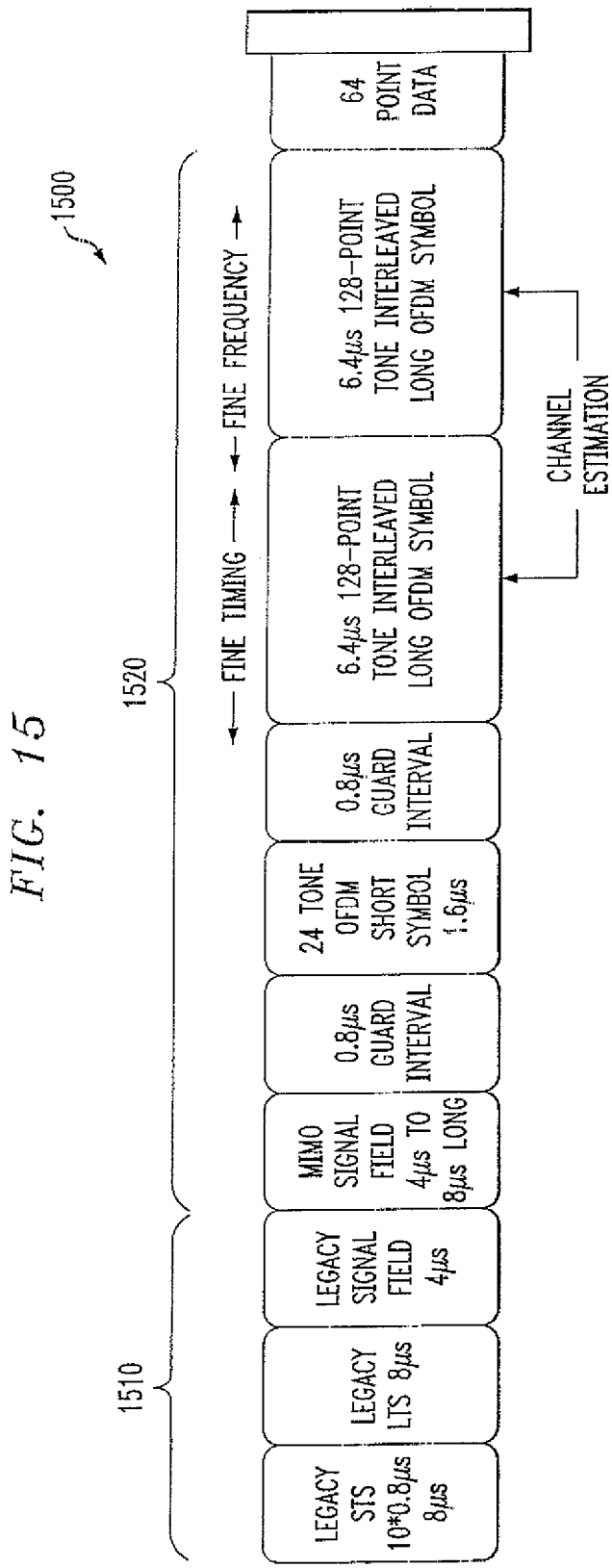
FIG. 15 illustrates an alternate backwards compatible preamble design.

FIG. 15 illustrates another backward compatible preamble design 1500. The preamble format 1500 has two parts, the legacy 1510 preamble concatenated with the MIMO training portion 1520. The difference here is that the long training field uses only one OFDM symbol but with 128 tones in a 20 MHz band or 256 tones in a 40 MHz band (symbol time remains 6.4 us in either case). Only one such long training field (having two OFDM symbols) is needed for the exemplary two transmit antenna implementation (two such long training fields are needed for three and four transmit antenna implementations). In the preamble design 1500, all the MIMO channels are estimated based on this one long training field. Time domain channel estimation or other frequency domain interpolation channel estimation schemes have to be used. The drawback of this kind of channel estimation scheme is the robustness of the performance. The channel estimation scheme could be sensitive to the channel delay profiles.

Generally, the preamble design 1500 reduces the preamble overhead by concatenating two 64-point OFDM symbols into one 128-point symbol. The preamble design 1500 does not include the 0.8 us guard interval, due to the two 128 point FFTs (thus requiring time domain channel estimation, which is more complex than performing Frequency Domain channel estimation (FDE)). It is noted that FDE cannot be performed since data symbols are on the 64-point frequency grid, whereas the long training symbol is on a 128-point frequency grid in the exemplary embodiment. If the data is on a 128 point FFT grid, then the 0.8 us GI is required.

In an implementation having four transmit antennas, the 128-point FFT gets replaced by a 256 point FFT and the OFDM symbol time increases to 12.8 us. This will save 2.4 us from the preamble (assuming that the data is 64 points).

Figure 16:
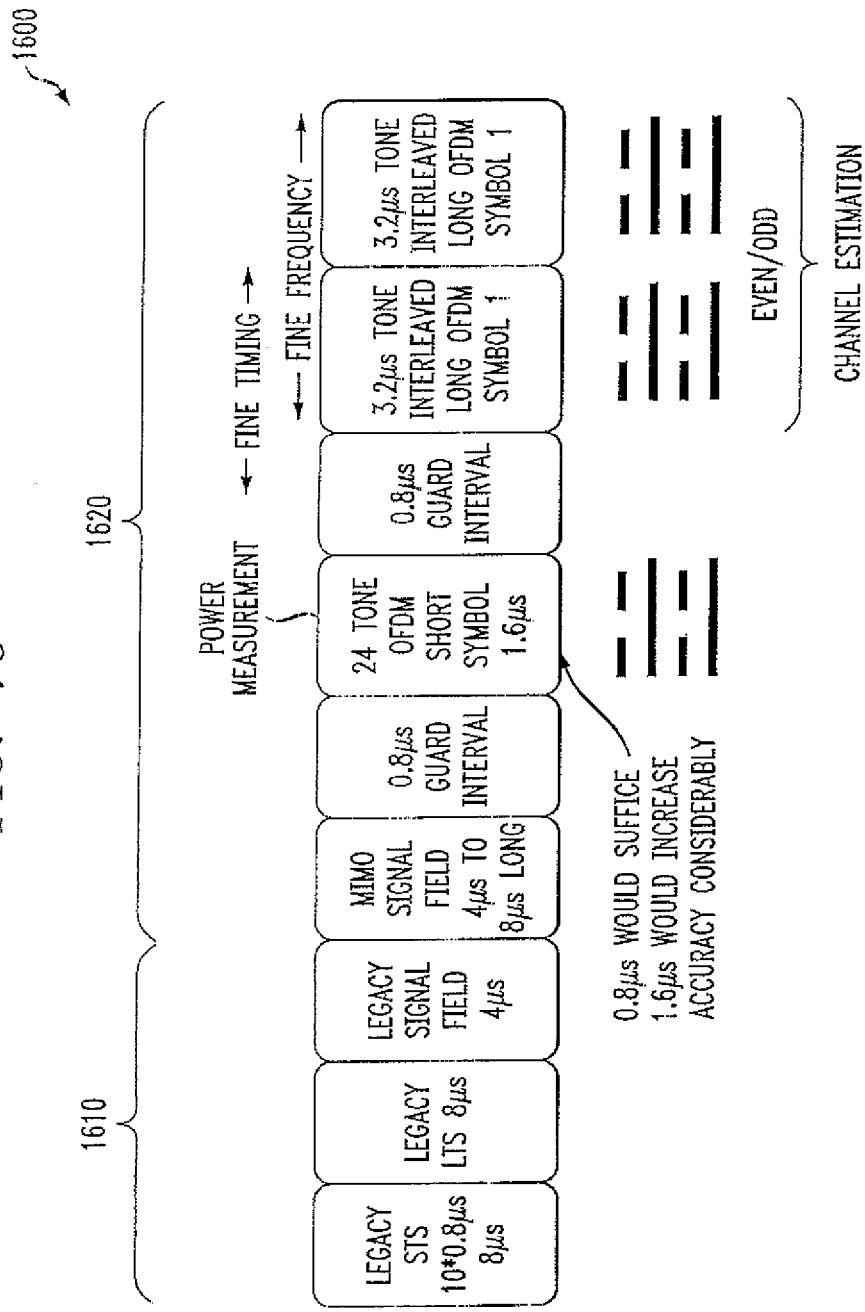
FIG. 16 illustrates an alternate preamble design incorporating features of the present invention that reduces the length of the preamble.

FIG. 16 illustrates another preamble design 1600 incorporating features of the present invention that reduces the length of the preamble. In the preamble design 1600, only one long training field (having two OFDM symbols) is transmitted. In this manner, only some of the tones are covered by the training, and the other tones have to be interpolated. While the performance of such a design 1600 is not robust, it could be helpful for certain applications, such as Voice over IP (VoIP), where the performance requirement is low while the packet is short.

SVD Preamble Design

Figure 17:
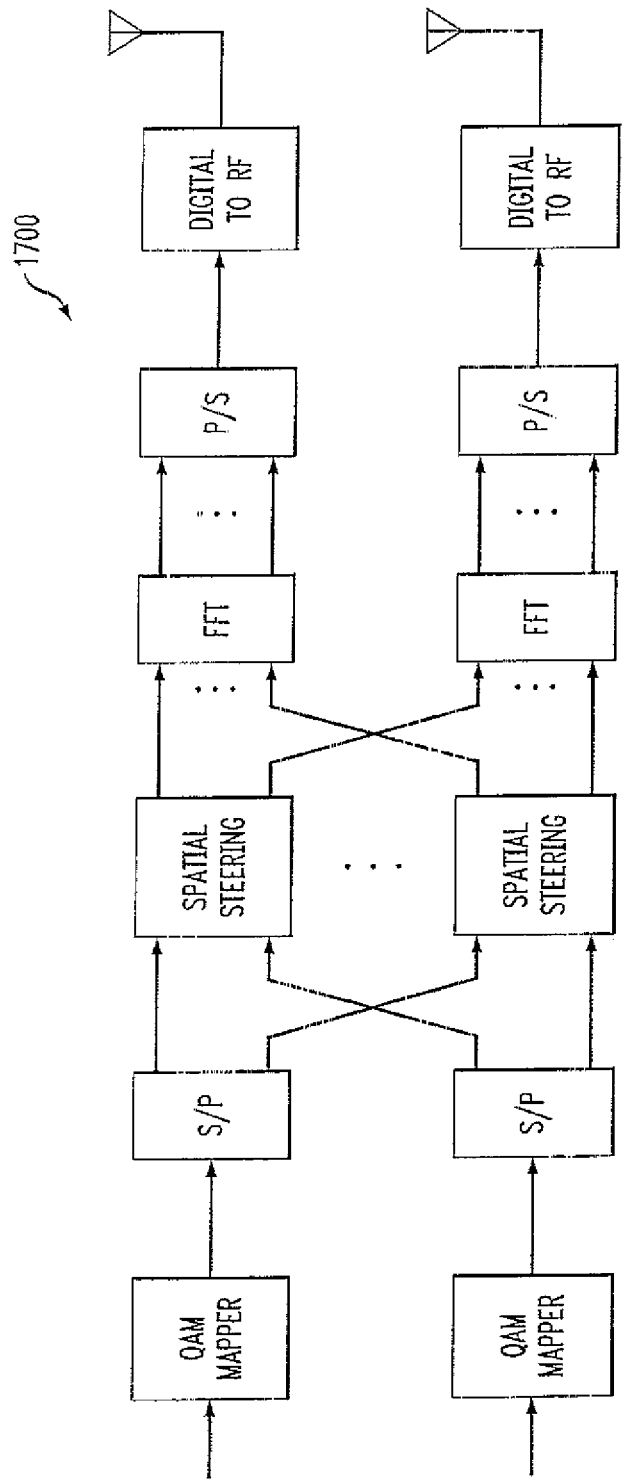
FIG. 17 is a schematic block diagram of a transmitter that extends the preamble formats of the present invention for SVD-MIMO.

FIG. 17 is a schematic block diagram of a transmitter 1700 that extends the preamble formats of the present invention for SVD-MIMO (Singular Value Decomposition MIMO). In an SVD mode, a steering matrix is applied to map the spatial streams to the transmit antennas, as shown in FIG. 17. FIG. 17 operates in a similar manner to FIG. 1, except for the introduction of the spatial steering matrix that varies the signal in the spatial domain.

Figure 18:
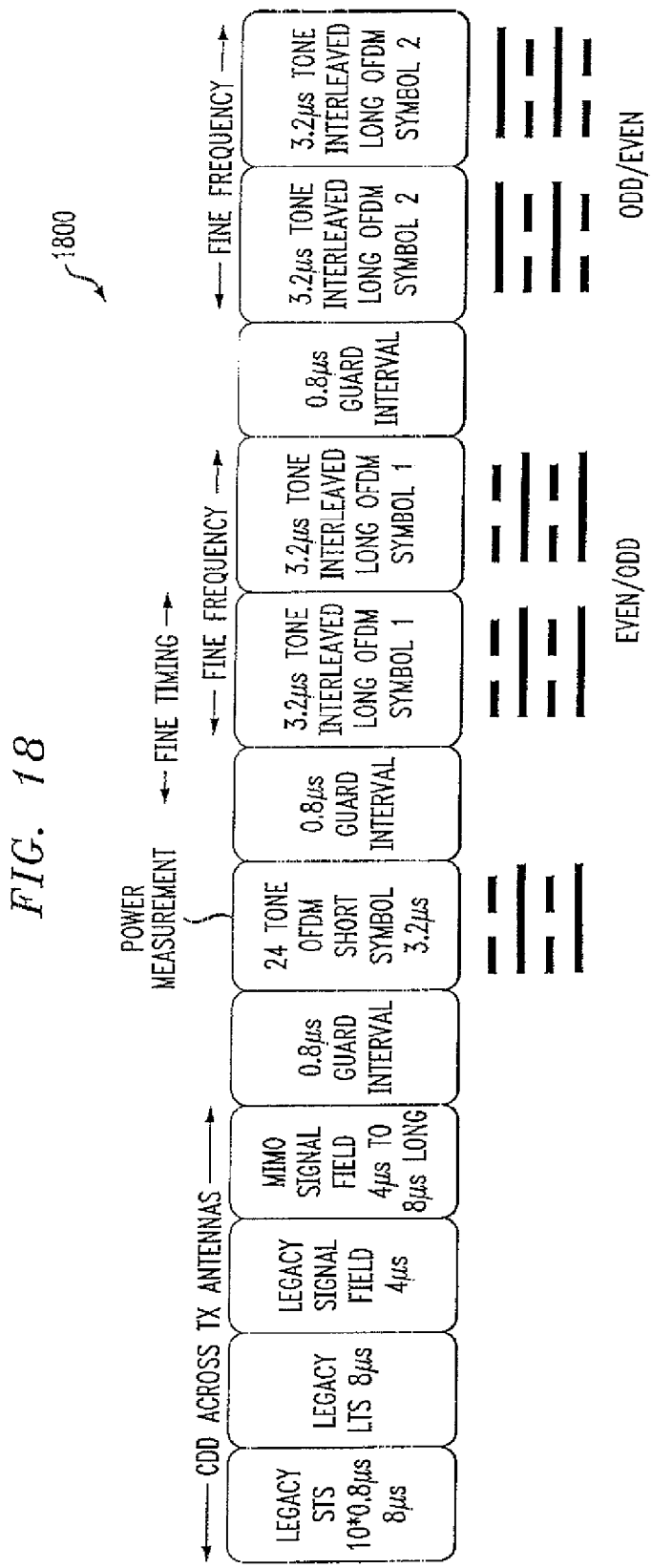
FIG. 18 illustrates a preamble format for SVD-MIMO.

FIG. 18 illustrates a preamble format 1800 incorporating features of the present invention for SVD-MIMO. Generally, the preamble 1800 needs more adjustment to maintain the system performance. In the preamble 1800, the MIMO short training needs to be much longer because each tone in SVD mode has different power scaling. In the exemplary format 1800 shown in FIG. 18, a 3.2 µs preamble is used for the AGC measurement which uses all 52 tones. The 52 tones are interleaved across all the spatial streams, and the corresponding steering matrix (from FIG. 17) is applied to each tone to form the training symbol that is sent on the transmit antennas. Depending on the performance requirement and channel delay profile, more than one such short training symbol may be needed. The tones in the long training field are going to be interleaved across the spatial streams first, as discussed below in conjunction with FIGS. 13 and 14, and then the steering matrices are applied to map to the transmit antennas.

Hybrid Preamble Design

Figure 19:
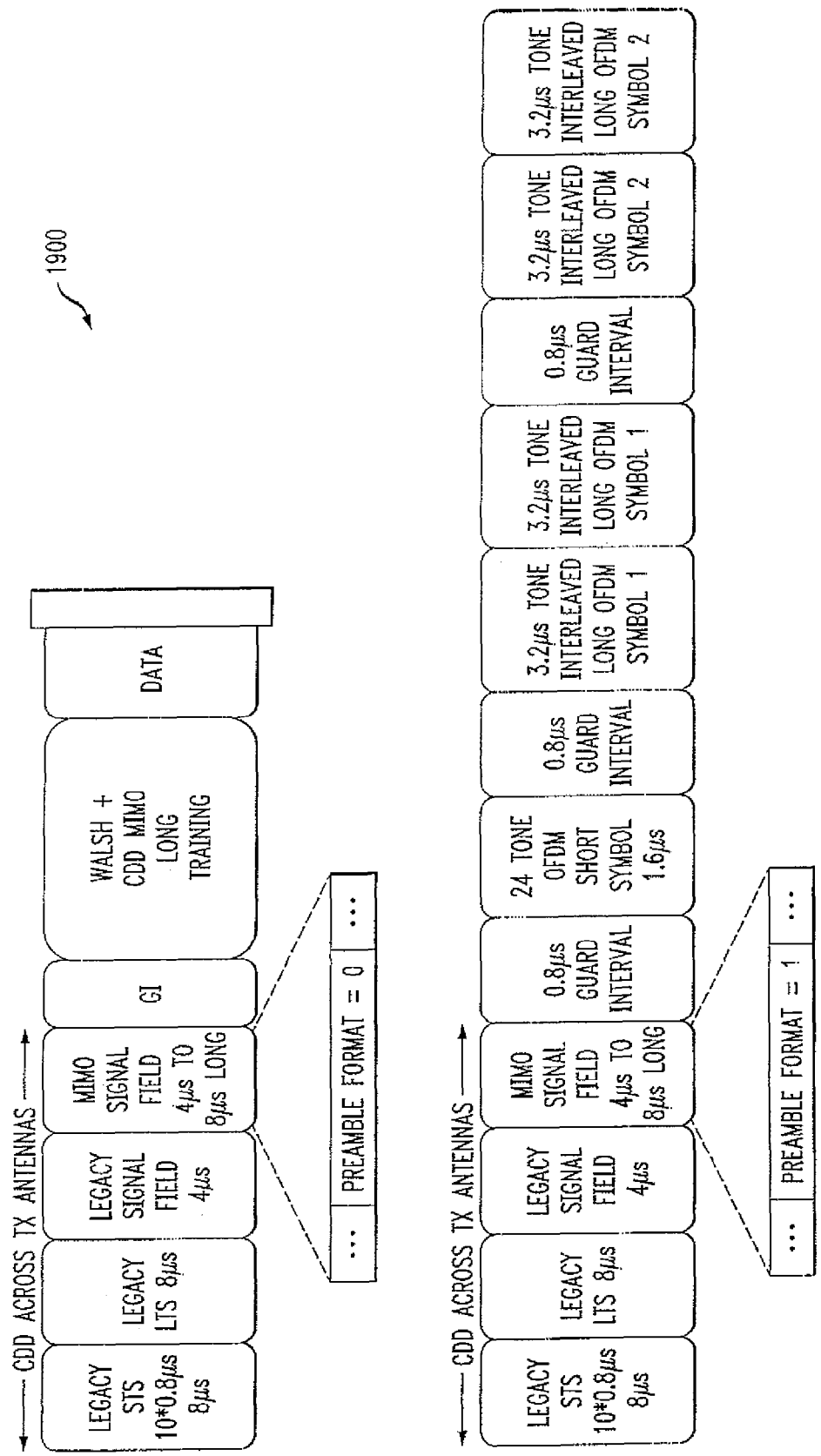
FIG. 19 illustrates a hybrid preamble design.

FIG. 19 illustrates a hybrid preamble design 1900 incorporating features of the present invention. The hybrid preamble design 1900 recognizes that the preamble designs discussed above in conjunction with FIGS. 4, 13-16, and 18 all have a common legacy preamble part followed by a legacy signal field and an HT signal field. Their difference lies in the following MIMO training part. Thus, the HT signal field can be used to signal the MIMO training format, as shown in FIG. 19. For longer packets, such as associated with video transmissions, the preamble design of FIGS. 13 and 14 can be used, having a longer preamble but demonstrating better performance. For shorter packets, such as associated with VoIP, the preamble design of FIG. 16 can be used, having shorter preambles and overhead. For such a design, only one or two bits are needed in the HT signal field to signal the preamble training format, as shown in FIG. 19.

It is to be understood that the embodiments and variations shown and described herein are merely illustrative of the principles of this invention and that various modifications may be implemented by those skilled in the art without departing from the scope and spirit of the invention.

We claim:

1. A method for transmitting data in a multiple antenna communication system having N transmit antennas, said method comprising the steps of:
obtaining a signal comprising a legacy preamble having at least one legacy long training field and at least one legacy short training field and an extended portion having in the range of one to N−1 additional long training fields on each of said N transmit antennas and at least one additional short training field, wherein each additional long training field contains one long OFDM symbol and N is greater than two, wherein said long OFDM symbol utilizes a frequency grid of M points and wherein a data OFDM symbol utilizes a frequency grid of M/2 points, and transmitting said signal.

2. The method of claim 1, wherein said legacy preamble further comprises one SIGNAL field.

3. The method of claim 1, wherein said legacy preamble is an 802.11 a/g preamble.

4. The method of claim 1, wherein said additional long training fields are tone interleaved across said N transmit antennas.

5. The method of claim 4, wherein N equals three and a first additional long training field uses a first set of tones on a first transmit antenna, a second set of tones on a second transmit antenna, and a third set of tones on a third transmit antenna.

6. The method of claim 1, wherein only said additional long training fields are used for MIMO channel estimation.

7. The method of claim 1, wherein said extended portion further includes said additional short training field for power estimation.

8. The method of claim 7, wherein said additional short training field is tone interleaved across said N transmit antennas.

9. The method of claim 7, wherein said additional short training field has an extended duration to support beam steering.

10. The method of claim 1, wherein said extended portion further includes a signal field identifying a preamble format.

11. A transmitter in a multiple antenna communication system, comprising:
N transmit antennas configured to transmit a signal obtained by a transmitter circuit, the signal comprising a legacy preamble having at least one legacy long training field and at least one legacy short training field and an extended portion having in the range of one to N−1 additional long training fields on each of said N transmit antennas and at least one additional short training field, wherein each additional long training field contains one long OFDM symbol and N is greater than two, wherein said long OFDM symbol utilizes a frequency grid of M points and wherein a data OFDM symbol utilizes a frequency grid of M/2 points.

12. The transmitter of claim 11, wherein said legacy preamble further comprises one SIGNAL field.

13. The transmitter of claim 11, wherein said additional long training fields are tone interleaved across said N transmit antennas.

14. The transmitter of claim 13, wherein N equals three and a first additional long training field uses a first set of tones on a first transmit antenna, a second set of tones on a second transmit antenna, and a third set of tones on a third transmit antenna.

15. The transmitter of claim 11, wherein only said additional long training fields are used for MIMO channel estimation.

16. The transmitter of claim 11, wherein said extended portion further includes said additional short training field for power estimation and a signal field identifying a preamble format.

17. A method for receiving data on at least one receive antenna transmitted by a transmitter having N transmit antennas in a multiple antenna communication system, said method comprising the steps of:
receiving a signal comprising a legacy preamble having at least one legacy long training field and at least one legacy short training field and an extended portion having in the range of one to N−1 additional long training fields on each of said N transmit antennas and at least one additional short training field, wherein each additional long training field contains one long OFDM symbol and N is greater than two, wherein said long OFDM symbol utilizes a frequency grid of M points and wherein a data OFDM symbol utilizes a frequency grid of M/2 points, and processing said signal.

18. The method of claim 17, wherein said additional long training fields are tone interleaved across said N transmit antennas.

19. The method of claim 17, wherein only said additional long training fields are used for MIMO channel estimation.

20. The method of claim 17, wherein said extended portion further includes said additional short training field for power estimation and a signal field identifying a preamble format.

21. A receiver in a multiple antenna communication system having at least one transmitter having N transmit antennas, comprising:
at least one receive antenna configured to receive a signal comprising a legacy preamble having at least one legacy long training field and at least one legacy short training field and an extended portion having in the range of one to N−1 additional long training fields on each of said N transmit antennas and at least one additional short training field, wherein each additional long training field contains one long OFDM symbol and N is greater than two, wherein said long OFDM symbol utilizes a frequency grid of M points and wherein a data OFDM symbol utilizes a frequency grid of M/2 points, and a receiver circuit configured to process the received signal.

22. The receiver of claim 21, wherein said additional long training fields are tone interleaved across said N transmit antennas.

23. The receiver of claim 21, wherein only said additional long training fields are used for MIMO channel estimation.

24. The receiver of claim 21, wherein said extended portion further includes said additional short training field for power estimation and a signal field identifying a preamble format.

* * * * *